United States Patent
Wu et al.

(10) Patent No.: US 10,501,612 B2
(45) Date of Patent: Dec. 10, 2019

(54) CURABLE COMPOSITION FOR SOUND BARRIER FILM

(71) Applicant: 3M INNOVATIVE PROPERTIES COMPANY, St. Paul, MN (US)

(72) Inventors: Pingfan Wu, Woodbury, MN (US); Lianzhou Chen, Woodbury, MN (US); Fredrick W. Vance, Westfield, IN (US); Edward E. Cole, Woodbury, MN (US); Charles W. Hedley, Danville, IN (US); Gregory L. Simon, Bloomington, IN (US); Michael C. Martin, Hudson, WI (US)

(73) Assignee: 3M Innovative Properties Company, St. Paul, MN (US)

(*) Notice: Subject to any disclaimer, the term of this patent is extended or adjusted under 35 U.S.C. 154(b) by 3 days.

(21) Appl. No.: 15/571,086

(22) PCT Filed: May 3, 2016

(86) PCT No.: PCT/US2016/030518
§ 371 (c)(1),
(2) Date: Nov. 1, 2017

(87) PCT Pub. No.: WO2016/179146
PCT Pub. Date: Nov. 10, 2016

(65) Prior Publication Data
US 2018/0346695 A1   Dec. 6, 2018

Related U.S. Application Data

(60) Provisional application No. 62/157,287, filed on May 5, 2015.

(51) Int. Cl.
| C08L 11/00 | (2006.01) |
| C08J 5/12 | (2006.01) |
| C08J 5/18 | (2006.01) |
| G10K 11/162 | (2006.01) |

(52) U.S. Cl.
CPC .............. C08L 11/00 (2013.01); C08J 5/121 (2013.01); C08J 5/18 (2013.01); G10K 11/162 (2013.01); *C08J 2311/00* (2013.01)

(58) Field of Classification Search
CPC . G10K 11/162; C08L 11/00; C08J 5/18; C08J 2311/162
USPC ....................................................... 181/294
See application file for complete search history.

(56) References Cited

U.S. PATENT DOCUMENTS

| 4,228,624 A | 10/1980 | Reneault |
| 4,434,592 A | 3/1984 | Reneault |
| 6,153,674 A * | 11/2000 | Landin ...................... C08K 7/02 524/35 |
| 6,207,245 B1 | 3/2001 | Miller |
| 2003/0148693 A1 | 8/2003 | Erb, Jr. |
| 2006/0046598 A1 | 3/2006 | Shah |
| 2008/0107456 A1 | 5/2008 | Mizumoto |
| 2008/0166937 A1 * | 7/2008 | Garvey ................... B32B 27/10 442/1 |
| 2008/0202619 A1 * | 8/2008 | Hirai ..................... F16L 11/081 138/126 |
| 2012/0243807 A1 | 9/2012 | Pascoe |
| 2013/0341120 A1 | 12/2013 | Koo |
| 2014/0242316 A1 * | 8/2014 | Shih ....................... B32B 27/08 428/41.3 |
| 2018/0104937 A1 * | 4/2018 | Wu ......................... B32B 5/022 |

FOREIGN PATENT DOCUMENTS

| CN | 103603472 | 2/2014 |
| CN | 103724740 | 4/2014 |
| EP | 0 270 716 | 6/1988 |
| EP | 0 258 793 | 8/1988 |
| EP | 0 538 145 | 4/1993 |
| EP | 1 586 442 | 10/2005 |
| EP | 2 236 286 | 10/2010 |
| EP | 2 363 325 | 9/2011 |

(Continued)

OTHER PUBLICATIONS

Coran, Aubert Y., "Vulcanization", *The Science and Technology of Rubber*, Chapter 7 (Third Edition, Elsevier 2005).

(Continued)

*Primary Examiner* — Forrest M Phillips
(74) *Attorney, Agent, or Firm* — Philip P. Soo

(57) ABSTRACT

A curable composition is provided comprising a curable rubber comprising: a) 80.0-99.9 wt % of a chloroprene resin; b) 0.06-13 wt % of trimethyl thiourea; and c) 0.06-13 wt % of a benzothiazolesulfenamide, such as N-cyclohexyl-2-benzothiazoles-ulfenamide. The present disclosure additionally provides cured compositions comprising a rubber comprising a crosslinked chloroprene resin and a fire retardant particle system comprising: d) 5-95 wt % particulate magnesium hydroxide ($Mg(OH)_2$); and e) 5-95 wt % particulate aluminum trihydrate ($Al(OH)_3$). In some embodiments the particulate aluminum trihydrate ($Al(OH)_3$) has a mean particle size of greater than 30 microns and less than 400 microns, and more typically a mean particle size of greater than 82 microns. The present disclosure additionally provides sound barrier films comprising the cured compositions according to the present disclosure, in particular fire resistant sound barrier films.

14 Claims, No Drawings

(56) References Cited

FOREIGN PATENT DOCUMENTS

| | | |
|---|---|---|
| EP | 2 711 389 | 3/2014 |
| FR | 2 553 809 | 4/1985 |
| FR | 2 632 672 | 12/1989 |
| FR | 2 635 603 | 2/1990 |
| FR | 2 697 270 | 4/1994 |
| GB | 1599540 | 10/1981 |
| JP | 2001-342299 A | 12/2001 |
| JP | 2002-069240 A | 3/2002 |
| JP | 2007-23102 | 2/2007 |
| KR | 10-0370343 | 1/2003 |
| KR | 101 132 791 | 6/2011 |
| WO | 2003/104317 | 12/2003 |
| WO | 2016/179339 | 11/2016 |

OTHER PUBLICATIONS

DuPONT, "DuPont™ Neoprene Curing Systems," (Rev. 5, 2010).
Garreta, "The Role of the Activator during the Vulcanization of Natural Rubber using Sulfenamide Accelerator Type", KGK Kautschuk Gummi Kunstsoffe 55. Jahrgang, Nr. Mar. 2002, pp. 82-85.
International Search Report for PCT/US2016/030518 dated Aug. 12, 2016 (4 pages).

* cited by examiner

CURABLE COMPOSITION FOR SOUND BARRIER FILM

CROSS REFERENCE TO RELATED APPLICATIONS

This application is a national stage filing under 35 U.S.C. 371 of PCT/US2016/030518, filed May 3, 2016, which claims the benefit of U.S. Provisional Patent Application No. 62/157,287, filed May 5, 2015, the disclosures of which are incorporated by reference in their entirety herein.

FIELD OF THE DISCLOSURE

This disclosure relates to curable compositions that comprise curable rubbers which may be cured to form sound barrier films, which may have fire resistant properties.

BACKGROUND OF THE DISCLOSURE

The following references may be relevant to the general field of technology of the present disclosure: GB 1,599,540; KR 10-0370343; JP2007-23102; Aubert Y. Coran, "Vulcanization", *The Science and Technology of Rubber*, Chapter 7 (Third Edition, Elsevier 2005); DuPont, "DuPont™ Neoprene Curing Systems," (Rev. 5, 2010).

SUMMARY OF THE DISCLOSURE

Briefly, the present disclosure provides a curable composition comprising a curable rubber comprising: a) 80.0-99.9 wt % of a chloroprene resin; b) 0.06-13 wt % of trimethyl thiourea; and c) 0.06-13 wt % of a benzothiazolesulfenamide. Typically, the benzothiazolesulfenamide is N-alkyl-2-benzothiazolesulfenamide, wherein the alkyl group contains 2-10 carbon atoms and is straight, branched, or cyclic. Most typically the benzothiazolesulfenamide is N-cyclohexyl-2-benzothiazolesulfenamide. In some embodiments, the curable composition additionally comprises a fire retardant particle system comprising: d) 5-95 wt % particulate magnesium hydroxide ($Mg(OH)_2$); and e) 5-95 wt % particulate aluminum trihydrate ($Al(OH)_3$). In some embodiments the particulate aluminum trihydrate ($Al(OH)_3$) has a mean particle size of greater than 30 microns and less than 400 microns, and more typically a mean particle size of greater than 82 microns. Additional embodiments of the curable composition of the present disclosure are described below under "Selected Embodiments."

The present disclosure additionally provides films comprising the curable composition of the present disclosure. In some embodiments, the films having a thickness of less than 1300 microns and greater than 135 microns. In some embodiments, the film is borne on a liner. In some embodiments, the liner comprises high density paper having an areal density of more than 100 $g/m^2$, a clay coating on a film-supporting face of the paper, and a silicone top coating on a reverse face of the paper. Additional embodiments of film comprising the curable composition of the present disclosure are described below under "Selected Embodiments."

The present disclosure additionally provides cured compositions comprising a rubber comprising a crosslinked chloroprene resin and a fire retardant particle system comprising: d) 5-95 wt % particulate magnesium hydroxide ($Mg(OH)_2$); and e) 5-95 wt % particulate aluminum trihydrate ($Al(OH)_3$). In some embodiments the particulate aluminum trihydrate ($Al(OH)_3$) has a mean particle size of greater than 30 microns and less than 400 microns, and more typically a mean particle size of greater than 82 microns. Additional embodiments of the cured composition of the present disclosure are described below under "Selected Embodiments."

The present disclosure additionally provides sound barrier films comprising the cured compositions according to the present disclosure. In some embodiments, the sound barrier films have a thickness of less than 1300 microns and greater than 135 microns. Typically, the sound barrier film is fire resistant to the extent that it passes the test specified on the filing date of this application in Appendix F, part VI, of US Federal Aviation Regulations § 25.856(a). Additional embodiments of the sound barrier films of the present disclosure are described below under "Selected Embodiments."

The present disclosure additionally provides a method of making a sound barrier film comprising the step of curing the lined uncured film described above while the film is borne on the liner. Additional embodiments of such methods are described below under "Selected Embodiments."

In this application:

"benzothiazolesulfenamide" means a species containing the moiety shown in formula I:

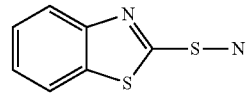

which may include N-cyclohexylbenzeneothiazole-2-sulfenamide (CBS):

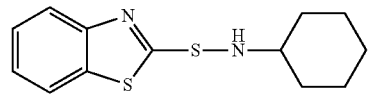 [SMILES: c1ccc2sc(SNC3CCCCC3)nc2c1]

N-t-butylbenzeneothiazole-2-sulfenamide (TBBS):

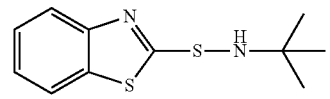

N-dicyclohexylbenzeneothiazole-2-sulfenamide (DCBS):

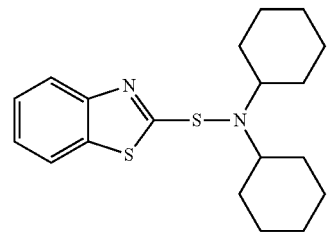 [SMILES: c1ccc2sc(SN(C3CCCCC3)C3CCCCC3)nc2c1]

2-morpholinothiobenzothiazole (MBS):

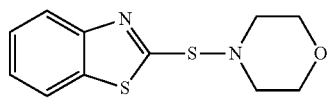 [SMILES: c1ccc2sc(SN3CCOCC3)nc2c1]

and the like, and which may be substituted;

"chloroprene resin" means a resin comprising a polymer or copolymer of chloroprene;

"trimethylthiourea" or "TMTU" means $(CH_3)_2N-C(=S)-NHCH_3$; and

"substituted" means, for a chemical species, group or moiety, substituted by conventional substituents which do not interfere with the desired product or process, e.g., substituents can be alkyl, alkoxy, aryl, phenyl, halo (F, Cl, Br, I), cyano, nitro, etc.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

DETAILED DESCRIPTION

The present disclosure provides curable compositions that comprise curable rubbers which cure to form sound barrier films, which may have fire resistant properties. In some embodiments, the present compositions simultaneously provide long shelf life at room temperature, reduced scorch time, fast cure at cure temperature, and fire resistance. In some embodiments, the uncured material is sufficiently tacky and malleable in itself that it can be joined with other materials such as fabric materials without use of adhesive and thereafter cured to form a strong interlayer bond.

The curable composition comprises a curable rubber comprising: 80.0-99.9 wt % of a chloroprene resin; 0.06-13 wt % of trimethyl thiourea; and 0.06-13 wt % of a benzothiazolesulfenamide. Typically the benzothiazolesulfenamide is a N-alkyl-2-benzothiazolesulfenamide, wherein the alkyl group contains 2-10 carbon atoms and is straight, branched, or cyclic; and most typically N-cyclohexyl-2-benzothiazolesulfenamide.

In addition, the curable composition may comprise a fire retardant particle system comprising: 5-95 wt % particulate magnesium hydroxide ($Mg(OH)_2$); and 5-95 wt % particulate aluminum trihydrate ($Al(OH)_3$). Applicants have found that improved fire resistance can be achieved using relatively large particle size aluminum trihydrate typically having a mean particle size of greater than 30 microns, in some embodiments greater than 36 microns, in some embodiments greater than 42 microns, and in some embodiments greater than 82 microns.

Components of the curable composition may additionally include chlorinated paraffin, a phosphorus-containing plasticizer, and carbon black. In some embodiments the curable composition includes no antimony. In some embodiments the curable composition includes less than 3.5 wt % zinc oxide.

Components of the curable composition may be compounded by any suitable method. Typically, components of the curable composition may be compounded without solvent. In some embodiments the curable composition is thereafter calendared so as to form an uncured film. In some embodiments the curable film is borne on a liner. In some applications, the film is joined with one or more fabric layers to form a sound and heat insulating blanket, such as described in U.S. patent application Ser. No. 62/157,297, filed on even date herewith, titled "Sound and Heat Insulating Blanket," the disclosure of which is incorporated herein by reference. In some applications, the film is cured on the liner to form a cured sound barrier film. In this application, a liner having appropriate characteristics may be used so as to prevent shrinkage or wrinkling of the film during cure, allow rolling, and allow release after cure.

Selected Embodiments

The following embodiments, designated by letter and number, are intended to further illustrate the present disclosure but should not be construed to unduly limit this disclosure.

CC1. A curable composition comprising a curable rubber comprising:
  a) 80.0-99.9 wt % of a chloroprene resin;
  b) 0.06-13 wt % of trimethyl thiourea; and
  c) 0.06-13 wt % of a benzothiazolesulfenamide.

CC2. The curable composition according to embodiment CC1 wherein the benzothiazolesulfenamide is N-alkyl-2-benzothiazolesulfenamide, wherein the alkyl group contains 2-10 carbon atoms and is straight, branched, or cyclic.

CC3. The curable composition according to embodiment CC1 wherein the benzothiazolesulfenamide is N-cyclohexyl-2-benzothiazolesulfenamide.

CC4. The curable composition according to any of the preceding embodiments wherein the curable rubber comprises greater than 0.11 wt % of trimethyl thiourea.

CC5. The curable composition according to any of the preceding embodiments wherein the curable rubber comprises greater than 0.30 wt % of trimethyl thiourea.

CC6. The curable composition according to any of the preceding embodiments wherein the curable rubber comprises less than 7.0 wt % of trimethyl thiourea.

CC7. The curable composition according to any of the preceding embodiments wherein the curable rubber comprises less than 3.0 wt % of trimethyl thiourea.

CC8. The curable composition according to any of the preceding embodiments wherein the curable rubber comprises greater than 0.11 wt % of the benzothiazolesulfenamide.

CC9. The curable composition according to any of the preceding embodiments wherein the curable rubber comprises greater than 0.30 wt % of the benzothiazolesulfenamide.

CC10. The curable composition according to any of the preceding embodiments wherein the curable rubber comprises less than 7.0 wt % of the benzothiazolesulfenamide.

CC11. The curable composition according to any of the preceding embodiments wherein the curable rubber comprises less than 3.0 wt % of the benzothiazolesulfenamide.

CC12. The curable composition according to any of the preceding embodiments wherein the chloroprene resin comprises a polymer or copolymer of chloroprene wherein greater than 55% of the monomer units of the polymer or copolymer are derived from chloroprene.

CC13. The curable composition according to any of the preceding embodiments wherein the chloroprene resin comprises a polymer or copolymer of chloroprene wherein greater than 78% of the monomer units of the polymer or copolymer are derived from chloroprene.

CC14. The curable composition according to any of the preceding embodiments wherein the chloroprene resin comprises a polymer or copolymer of chloroprene wherein greater than 91% of the monomer units of the polymer or copolymer are derived from chloroprene.

CC15. The curable composition according to any of the preceding embodiments wherein the chloroprene resin comprises a polymer or copolymer of chloroprene wherein greater than 99% of the monomer units of the polymer or copolymer are derived from chloroprene.

CC16. The curable composition according to any of the preceding embodiments additionally comprising a fire retardant particle system comprising:
  d) 5-95 wt % particulate magnesium hydroxide ($Mg(OH)_2$); and
  e) 5-95 wt % particulate aluminum trihydrate ($Al(OH)_3$).

CC17. The curable composition according to embodiment CC16 wherein the fire retardant particle system comprises:
  d) 10-45 wt % particulate magnesium hydroxide ($Mg(OH)_2$); and
  e) 55-90 wt % particulate aluminum trihydrate ($Al(OH)_3$).

CC18. The curable composition according to embodiment CC16 wherein the fire retardant particle system comprises:
  d) 15-40 wt % particulate magnesium hydroxide ($Mg(OH)_2$); and
  e) 60-85 wt % particulate aluminum trihydrate ($Al(OH)_3$).

CC19. The curable composition according to any of embodiments CC16-CC18 wherein the particulate aluminum trihydrate ($Al(OH)_3$) has a mean particle size of greater than 30 microns.

CC20. The curable composition according to any of embodiments CC16-CC18 wherein the particulate aluminum trihydrate ($Al(OH)_3$) has a mean particle size of greater than 36 microns.

CC21. The curable composition according to any of embodiments CC16-CC18 wherein the particulate aluminum trihydrate ($Al(OH)_3$) has a mean particle size of greater than 42 microns.

CC22. The curable composition according to any of embodiments CC16-CC18 wherein the particulate aluminum trihydrate ($Al(OH)_3$) has a mean particle size of greater than 82 microns.

CC23. The curable composition according to any of embodiments CC16-CC22 wherein the particulate aluminum trihydrate ($Al(OH)_3$) has a mean particle size of less than 400 microns.

CC24. The curable composition according to any of embodiments CC16-CC22 wherein the particulate aluminum trihydrate ($Al(OH)_3$) has a mean particle size of less than 170 microns.

CC25. The curable composition according to any of embodiments CC16-CC24 wherein the weight ratio of curable rubber to fire retardant particle system is between 1:3 and 3:1.

CC26. The curable composition according to any of embodiments CC16-CC24 wherein the weight ratio of curable rubber to fire retardant particle system is between 1:3 and 1:1.

CC27. The curable composition according to any of embodiments CC16-CC24 wherein the weight ratio of curable rubber to fire retardant particle system is between 2:5 and 2:3.

CC28. The curable composition according to any of embodiments CC16-CC24 wherein the weight ratio of curable rubber to fire retardant particle system is between 1:1 and 3:1.

CC29. The curable composition according to any of embodiments CC16-CC24 wherein the weight ratio of curable rubber to fire retardant particle system is between 10:9 and 2:1.

CC30. The curable composition according to any of the preceding embodiments additionally comprising chlorinated paraffin.

CC31. The curable composition according to any of the preceding embodiments additionally comprising a phosphorus-containing plasticizer.

CC32. The curable composition according to any of the preceding embodiments additionally comprising carbon black.

CC33. The curable composition according to any of the preceding embodiments which comprises no antimony.

CC34. The curable composition according to any of the preceding embodiments which comprises less than 3.5 wt % zinc oxide.

CC35. The curable composition according to any of the preceding embodiments which comprises less than 1.5 wt % zinc oxide.

UF1. A film comprising the curable composition according to any of embodiments CC1-CC35.

UF2. The film according to embodiment UF1 having a thickness of less than 1300 microns.

UF3. The film according to embodiment UF1 having a thickness of less than 1100 microns.

UF4. The film according to embodiment UF1 having a thickness of less than 600 microns.

UF5. The film according to embodiment UF1 having a thickness of less than 500 microns.

UF6. The film according to any of embodiments UF1-UF5 having a thickness of greater than 135 microns.

UF7. The film according to any of embodiments UF1-UF54 having a thickness of greater than 300 microns.

LUF1. A lined film comprising the film according to any of embodiments UF1-UF6 borne on a liner, wherein the liner comprises high density paper having an areal density of more than 100 g/m$^2$, a clay coating on a film-supporting face of the paper, and a silicone top coating on a reverse face of the paper.

LUF2. The lined film according to embodiment LUF1, wherein the release force between the film supporting face of the paper and the film as determined by 180 degree peel test is greater than 75 g per 25 mm width and less than 150 g per 25 mm width.

R1. A cured composition resulting from the cure of the curable composition according to any of embodiments CC1-CC33.

R2. A cured composition comprising a rubber comprising a crosslinked chloroprene resin and a fire retardant particle system comprising:
  d) 5-95 wt % particulate magnesium hydroxide ($Mg(OH)_2$); and
  e) 5-95 wt % particulate aluminum trihydrate ($Al(OH)_3$).

R3. The cured composition according to embodiment R2 wherein the fire retardant particle system comprises:
  d) 10-45 wt % particulate magnesium hydroxide ($Mg(OH)_2$); and
  e) 55-90 wt % particulate aluminum trihydrate ($Al(OH)_3$).

R4. The cured composition according to embodiment R2 wherein the fire retardant particle system comprises:
  d) 15-40 wt % particulate magnesium hydroxide ($Mg(OH)_2$); and
  e) 60-85 wt % particulate aluminum trihydrate ($Al(OH)_3$).

R5. The cured composition according to any of embodiments R2-R4 wherein the particulate aluminum trihydrate ($Al(OH)_3$) has a mean particle size of greater than 30 microns.

R6. The cured composition according to any of embodiments R2-R4 wherein the particulate aluminum trihydrate ($Al(OH)_3$) has a mean particle size of greater than 36 microns.

R7. The cured composition according to any of embodiments R2-R4 wherein the particulate aluminum trihydrate ($Al(OH)_3$) has a mean particle size of greater than 42 microns.

R8. The cured composition according to any of embodiments R2-R4 wherein the particulate aluminum trihydrate ($Al(OH)_3$) has a mean particle size of greater than 82 microns.

R9. The cured composition according to any of embodiments R2-R8 wherein the particulate aluminum trihydrate ($Al(OH)_3$) has a mean particle size of less than 400 microns.

R10. The cured composition according to any of embodiments R2-R8 wherein the particulate aluminum trihydrate ($Al(OH)_3$) has a mean particle size of less than 170 microns.

R11. The cured composition according to any of embodiments R2-R10 wherein the weight ratio of rubber to fire retardant particle system is between 1:3 and 3:1.

R12. The cured composition according to any of embodiments R2-R10 wherein the weight ratio of rubber to fire retardant particle system is between 1:3 and 1:1.

R13. The cured composition to any of embodiments R2-R10 wherein the weight ratio of rubber to fire retardant particle system is between 2:5 and 2:3.

R14. The cured composition according to any of embodiments R2-R10 wherein the weight ratio of rubber to fire retardant particle system is between 1:1 and 3:1.

R15. The cured composition according to any of embodiments R2-R10 wherein the weight ratio of rubber to fire retardant particle system is between 10:9 and 2:1.

R16. The cured composition according to any of embodiments R2-R15 additionally comprising chlorinated paraffin.

R17. The cured composition according to any of embodiments R2-R16 additionally comprising a phosphorus-containing plasticizer.

R18. The cured composition according to any of embodiments R2-R17 additionally comprising carbon black.

R19. The cured composition according to any of embodiments R2-R18 which comprises no antimony.

R20. The cured composition according to any of embodiments R2-R19 which comprises less than 3.5 wt % zinc oxide.

R21. The cured composition according to any of embodiments R2-R19 which comprises less than 1.5 wt % zinc oxide.

F1. A sound barrier film comprising the cured composition according to any of embodiments R1-R21.

F2. The sound barrier film according to embodiment F1 having a thickness of less than 1300 microns.

F3. The sound barrier film according to embodiment F1 having a thickness of less than 1100 microns.

F4. The sound barrier film according to embodiment F1 having a thickness of less than 600 microns.

F5. The sound barrier film according to any of embodiments F1-F4 having a thickness of less than 500 microns.

F6. The sound barrier film according to any of embodiments F1-F4 having a thickness of greater than 135 microns.

F7. The sound barrier film according to any of embodiments F1-F4 having a thickness of greater than 300 microns.

F8. The sound barrier film according to any of embodiments F1-F7 which is fire resistant to the extent that it passes the test specified on the filing date of this application in Appendix F, part VI, of US Federal Aviation Regulations § 25.856(a).

LF1. A lined sound barrier film comprising a sound barrier film according to any of embodiments F1-F8 borne on a liner, wherein the liner comprises high density paper having an areal density of more than 100 $g/m^2$, a clay coating on at least the film-supporting face of the paper, and a silicone top coating on a reverse face of the paper.

LF2. The lined sound barrier film according to embodiment LF1, wherein the release force between the film supporting face of the paper and the film as determined by 180 degree peel test is greater than 75 g per 25 mm width and less than 150 g per 25 mm width.

M1. A method of making a sound barrier film comprising the step of curing the lined film according to embodiment LUF1 or LUF2 while the film is borne on said liner.

M2. The method according to embodiment M1, additionally comprising the step of separating the sound barrier film from the liner.

Objects and advantages of this disclosure are further illustrated by the following examples, but the particular materials and amounts thereof recited in these examples, as well as other conditions and details, should not be construed to unduly limit this disclosure.

EXAMPLES

Unless otherwise noted, all reagents were obtained or are available from Sigma-Aldrich Company, St. Louis, Mo., or may be synthesized by known methods. Unless otherwise reported, all ratios are by weight percent.

The Following Abbreviations are Used to Describe the Examples:
  ° F.: degrees Fahrenheit
  ° C.: degrees Centigrade
  cm: centimeter
  gsm: grams per square centimeter
  Kg: kilogram
  mil: 1/1000 inch
  µm: micrometer
  rpm: revolutions per minute
  phr: parts per hundred parts of rubber, by weight Abbreviations for the Materials Used in the Examples are as Follows:

AC-18: Octadecanamide, obtained under the trade designation "PROAID AC-18-DSA" from Akrochem Corporation, Akron, Ohio.

AOS: An octylated diphenylamine antioxidant, obtained under the trade designation "ANTIOXIDANT S" from Akrochem Corporation.

ATH-H710: 1.1 μmm median particle diameter aluminum trihydrate, obtained under the trade designation "HYDRAL 710" from Akrochem Corporation.

ATH-SH20: 100 μm median particle diameter aluminum trihydrate, obtained under the trade designation "SH 20 ALUMINUM TRIHYDRATE" from Dadco Alumina & Chemicals Ltd., St. Peter Port, Guernsey.

C-700: A chlorinated paraffin wax, obtained under the trade designation "CHLOREZ 700" from Dover Chemical Corporation, Dover, Ohio.

CaO: Calcium oxide, obtained from Sigma-Aldrich Company.

CB-1220: A polybutadiene rubber, obtained under the trade designation "BUNA CB-1220" from Lanxess GmbH, Koln, Germany.

CBS: N-cyclohexyl-2-benzothiazolesulfenamide, obtained under the trade designation "DURAX CBS" from Vanderbilt Chemicals, LLC, Norwalk, Conn.

EF-2: Trimethylthiourea, obtained under the trade designation "THIATE EF-2" from Vanderbilt Chemicals, LLC.

EPON 828: Diglycidyl ether of bisphenol A with an approximate epoxy equivalent weight of 187.5 grams/equivalent, obtained under the trade designation "EPON-828" from Hexion Specialty Chemicals, Houston, Tex.

MD-1024: 1,2-Bis(3,5-di-tert-butyl-4-hydroxyhydrocinnamoyl)hydrazine, obtained under the trade designation "IRGANOX MD 1024" from BASF Corporation, Florham Park, N.J.

$Mg(OH)_2$: 2 μm magnesium hydroxide, obtained under the trade designation "VERSAMAG" from Akrochem Corporation.

N-550: A carcass grade carbon black, obtained under the trade designation "CONTINEX N550 CARBON BLACK" from Continental Carbon, Houston, Tex.

N-774: A industrial grade carbon black, obtained under the trade designation "CONTINEX N774 CARBON BLACK" from Continental Carbon.

Neoprene: A neoprene rubber, obtained under the trade designation "NEOPRENE-TW" from E.I. du Dupont de Nemours and Company, Wilmington, Del.

PML: Di-tolylguanidine salt of dicatechol borate, obtained under the trade designation "VANAX PML" Vanderbilt Chemicals, LLC.

RF-65: A phenol/isopropylated phosphate, obtained under the trade designation "REOFOS 65" from Chemtura Corporation, Philadelphia, Pa.

$Sb_2O_3$: Antimony oxide, obtained from Sigma-Aldrich Company.

SA: Stearic acid, obtained from Sigma-Aldrich Company.

ZBR: Zinc borate, obtained from Akrochem Corporation.

ZnO: Zinc oxide, obtained from Sigma-Aldrich Company.

Liners Used in the Examples and Comparatives are Identified as Follows:

HOSTAPHAN: A 2 mil (50.8 μm) polyester liner, silicone coated both sides, type "HOSTAPHAN 22KMN", from Mitsubishi Polyester Film, Inc., Greer, S.C.

ITASA: A 4.4 mil (111.7 μm), 120 gsm double sided clay coated paper liner, having a silicone release coating over one of the clay coats, obtained under the trade designation "120/SC2DM50" from Itasa B Sorabilla s/n, Andoain, Spain.

SAPPI: A 5.5 mil (140 μm), 154 gsm paper liner, clay coated both sides, obtained under the trade designation "S/K VEZ 4062" from Sappi North America, Boston, Mass.

GLATFELTER: A 6 mil (152.4 μm), 133 gsm paper liner, one side polyolefin coated and the opposing side clay coated, obtained under the trade designation "EXHERE STAY M 950E 92S" from Glatfelter, York, Pa.

Curing System

Comparative A 100 parts neoprene was transferred to a 3 Liter Banbury blender operating at 21° C. and 75 rpm. With the exception of RF-65, the remaining components listed in Table 1 were homogeneously dry mixed. RF-65 was then blended into the dry mix before transferring to the Banbury blender. The temperature was then raised to 190° F. (87.8° C.) over 5 minutes, after which the compounded fire-resistant (FR) rubber was removed.

Comparatives B-C

The procedure generally described in Comparative A was repeated, according to the compositions listed in Table 1.

Example 1

The procedure generally described in Comparative C was repeated, wherein the EPON 828 was substituted by an equal amount of CBS.

TABLE 1

| | phr (by wt.) | | | |
|---|---|---|---|---|
| Component | Comparative A | Comparative B | Comparative C | Example 1 |
| Neoprene | 100.0 | 100.0 | 100.0 | 100.0 |
| RF-65 | 12.8 | 9.6 | 15.2 | 20.0 |
| MD-1024 | 4.8 | 4.8 | 4.8 | 4.8 |
| ATH-SH20 | 105.6 | 108.0 | 108.0 | 107.2 |
| $Mg(OH)_2$ | 58.4 | 58.4 | 60.0 | 58.8 |
| ZnO | 3.2 | 3.6 | 3.2 | 3.2 |
| SA | 2.2 | 1.6 | 1.6 | 1.6 |
| EF-2 | 0 | 0.5 | 0.5 | 0.5 |
| EPON 828 | 0 | 0 | 1.6 | 0 |
| PML | 0.5 | 0 | 0 | 0 |
| CaO | 0.5 | 0 | 0 | 0 |
| CBS | 0 | 0 | 0 | 1.8 |

Scorch times at t3, t10 and t18 were determined using a model "MV 2000" Mooney viscometer from Alpha Technologies, Akron, Ohio, according to ASTM-1646-06. Results are listed in Table 2. Curing time at t90 was determined using a MDR from Alpha Technologies, Akron, Ohio, according to ASTM-D5289-95. Results are listed in Table 2.

TABLE 2

| | Scorch Time @ 121° C. (minutes) | | | Curing Time t90 @ 160° C. |
|---|---|---|---|---|
| Sample | t3 | t10 | t18 | (minutes) |
| Comparative A | 8.28 | 10.77 | 12.43 | 16.22 |
| Comparative B | 7.18 | 9.66 | 11.12 | 7.05 |
| Comparative C | 9.78 | 13.59 | 16.15 | 13.75 |
| Example 1 | 16.04 | 25.86 | 30.27 | 11.33 |

Flame Resistance

The procedure generally described in Example 1 was repeated, according to the compositions listed in Table 3. Scorch and curing times are reported in Table 4.

TABLE 3

| | Composition (phr) | | | | |
|---|---|---|---|---|---|
| Component | Example 2 | Example 3 | Example 4 | Example 5 | Example 6 |
| Neoprene | 100.0 | 100.0 | 100.0 | 100.0 | 100.0 |
| RF-65 | 6.0 | 6.0 | 6.0 | 6.0 | 6.0 |
| MD-1024 | 3.6 | 0 | 0 | 0 | 2.0 |
| AOS | 0 | 2.0 | 2.0 | 2.0 | 0 |
| ATH-SH20 | 119.0 | 40.0 | 40.0 | 50.0 | 50.0 |
| Mg(OH)$_2$ | 68.0 | 25.0 | 25.0 | 25.0 | 25.0 |
| ZBR | 0 | 10.0 | 15.0 | 20.0 | 20.0 |
| Sb$_2$O$_3$ | 0 | 5.5 | 5.5 | 0 | 0 |
| C-700 | 20.0 | 20.0 | 30.0 | 30.0 | 30.0 |
| ZnO | 3.0 | 3.0 | 3.0 | 3.0 | 3.0 |
| AC-18 | 0 | 0 | 0 | 0.5 | 0.5 |
| N-550 | 0.1 | 10.0 | 10.0 | 10.0 | 10.0 |
| SA | 0.5 | 0.5 | 0.5 | 0.5 | 0.5 |
| EF-2 | 0.8 | 0.8 | 0.8 | 0.8 | 1.0 |
| CBS | 1.0 | 1.0 | 1.0 | 1.0 | 1.5 |
| CB-1220 | 4.0 | 4.0 | 4.0 | 4.0 | 4.0 |

TABLE 4

| | Scorch Time @ 121° C. (minutes) | | | Curing Time t90 @ 160° C. |
|---|---|---|---|---|
| Sample | t3 | t10 | t18 | (minutes) |
| Example 2 | 10.26 | 16.17 | 19.23 | 16.55 |
| Example 3 | 12.14 | 16.52 | 18.50 | 12.95 |
| Example 4 | 9.75 | 14.01 | 16.39 | 13.40 |
| Example 5 | 6.90 | 9.81 | 11.85 | 12.50 |
| Example 6 | 9.33 | 13.02 | 14.86 | 12.62 |

A hot press, model 50T, from Wabash Engineering, Wabash, Ind., was set to 340° F. (171.1° C.). HOSTAPHAN liner was centered on the hot press, a 12 by 12 inch (30.48 by 30.48 cm) open stainless steel spacer was laid over the polyester liner and approximately 100 grams of the compounded FR rubber transferred into the spacer. Another HOSTAPHAN liner was placed over the spacer and 0.1 ton (101.6 Kg) force applied for 30 seconds. Force was then increased to 35 tons (35.562 Kg) for 10 minutes, after which the pressed sample was removed and allowed to cool to 21° C. The resulting 12 by 12 inch by 22 mil (30.48 by 30.48 cm by 55.9 μm) sheets were bisected and each half subjected to a flammability test according to FAR 25.856a. Results are listed in Table 5.

TABLE 5

| Example | Self-Extinguish Time (seconds) |
|---|---|
| Example 2 | 1.5; 1.8 |
| Example 3 | 0; 0 |
| Example 4 | 0; 0 |
| Example 5 | 1.4; 1.1; 0.7 |
| Example 6 | 1.1; 0; 2.4 |

ATH Particle Size

Example 7

Comparative D

Duplicate samples of compounded FR rubber were prepared according to the procedure generally described in Example 2, according to the compositions listed in Table 6.

TABLE 6

| | Composition (phr) | |
|---|---|---|
| Component | Example 7 | Comparative D |
| Neoprene | 100.00 | 100.00 |
| RF-65 | 11.46 | 11.46 |
| MD-1024 | 3.67 | 3.67 |
| ATH-SH2 | 107.70 | 0 |
| ATH-H710 | 0 | 107.70 |
| Mg(OH)$_2$ | 58.7 | 58.7 |
| ZnO | 3.00 | 3.00 |
| N774 | 0.07 | 0.07 |
| SA | 1.28 | 1.28 |
| EF-2 | 1.00 | 1.00 |
| CBS | 1.52 | 1.52 |

Each compounded FR rubber composition was hot pressed into 12 by 12 inch (30.48 by 30.48 cm) sheets, thicknesses recorded, and subjected to flammability tests according to the procedures listed described in Example 2. Results are listed in table 7

TABLE 7

| Sample | Thickness (mil/μm) | Self-Extinguish Time (seconds) |
|---|---|---|
| Example 7-1 | 20 | 1.8 |
| Example 7-1 | 22 | 2.3 |
| Example 7-1 | 21 | 2.1 |
| Example 7-2 | 22 | 2.5 |
| Example 7-2 | 23 | 1.3 |
| Example 7-2 | 26 | 2.5 |
| Comparative D-1 | 26.5 | 5.9 |
| Comparative D-1 | 26.5 | 2.7 |
| Comparative D-1 | 30 | 3.6 |
| Comparative D-2 | 20 | 2.3 |
| Comparative D-2 | 27 | 3.4 |
| Comparative D-2 | 22 | 2.0 |
| Comparative D-2 | 21 | 3.3 |
| Comparative D-2 | 21 | 2.8 |
| Comparative D-2 | 22 | 2.0 |

Liner Compatibility—Hot Press

Example 8-A 100 grams compounded FR rubber Example 6 was film formed between the clay coated sides of the ITASA liners in the Wabash hot press, for 1 minute at a force of 0.1 ton (101.6 Kg) at 130° F. (54.4° C.), then 10 minutes at a force of 10 tons (10,160 Kg). The liner/film assembly was then transferred to an oven set at 320° F. (160° C.) for 10 minutes, the assembly removed and cooled to 21° C. The liners were cleanly removed from the FR rubber film.

Example 8-B

The hot press procedure generally described in Example 8-A was repeated, wherein the FR rubber compound was film formed against the silicone coated sides of the ITASA liners. While the liners were cleanly released from the FR rubber film, the film exhibited some degree of wrinkling.

Comparatives E-G

The hot press procedure generally described in Example 8-A was repeated, wherein the ITASA liners were replaced with the SAPPI, GLATFELTER and HOSTAPHAN liners, respectively. With respect to the paper liners, the FR rubber compound was hot pressed against identical coated sides of the liners, i.e., clay coat to clay coat, polycoat to polycoat, etc. The resulting FR rubber film released cleanly from opposing clay coated sides of both the SAPPI and the GLATFELTER paper liners. However, the polycoated side of the GLATFELTER liner stuck to the surface of the hot press. When hot pressed against the uncoated sides of the SAPPI and the polycoated sides of the GLATFELTER liners, respectively, the FR rubber films did not release. With respect to the HOSTAPHAN, the polyester liners cleanly released, but the FR rubber film wrinkled during the oven cycle.

Liner Compatibility—Calendaring

Example 9

Compounded FR rubber Example 6 was calendared into a 57 inch (144.8 cm) wide web, at a nominal thickness of 22 mils (55.9 µm), onto the ITASA paper liner, by means of a 3-roll mill at 103-119° F. (39.4-48.3° C.). The web roll was then oven cured at 320° F. (160° C.) for 10 minutes, removed from the oven and allowed to cool to 21° C. The FR barrier film readily released from the liner, without wrinkling.

Comparatives H-I

The procedure described in Example 9 was repeated, wherein the ITASA paper liner was substituted with the GLATFELTER and the HOSTAPHAN liners, respectively. The FR barrier film fused to the GLATFELTER paper liner. With respect to the HOSTAPHAN, the FR barrier film released cleanly from the polyester liner but exhibited significant wrinkling. Various modifications and alterations of this disclosure will become apparent to those skilled in the art without departing from the scope and principles of this disclosure, and it should be understood that this disclosure is not to be unduly limited to the illustrative embodiments set forth hereinabove.

We claim:

1. A curable composition comprising a curable rubber comprising:
    a) 80.0-99.9 wt % of a chloroprene resin;
    b) 0.06-13 wt % of trimethyl thiourea; and
    c) 0.06-13 wt % of a benzothiazolesulfenamide, based on the overall weight of the curable rubber, the curable composition additionally comprising a fire retardant particle system comprising:
    d) 5-95 wt % particulate magnesium hydroxide $(Mg(OH)_2)$; and
    e) 5-95 wt % particulate aluminum trihydrate $(Al(OH)_3)$, based on the overall weight of the fire retardant particle system, wherein the particulate aluminum trihydrate $(Al(OH)_3)$ has a mean particle size of greater than 30 microns.

2. The curable composition according to claim 1 wherein the benzothiazolesulfenamide is N-alkyl-2-benzothiazolesulfenamide, wherein the alkyl group contains 2-10 carbon atoms and is straight, branched, or cyclic.

3. The curable composition according to claim 1 wherein the benzothiazolesulfenamide is N-cyclohexyl-2-benzothiazolesulfenamide.

4. The curable composition according to claim 1 wherein the particulate aluminum trihydrate $(Al(OH)_3)$ has a mean particle size of less than 400 microns.

5. The curable composition according to claim 1 wherein the particulate aluminum trihydrate $(Al(OH)_3)$ has a mean particle size of greater than 82 microns.

6. A film comprising the curable composition according to claim 1 having a thickness of less than 1300 microns and greater than 135 microns.

7. A lined film comprising the film according to claim 6 borne on a liner, wherein the liner comprises high density paper having an areal density of more than 100 g/m$^2$, a clay coating on a film-supporting face of the paper, and a silicone top coating on a reverse face of the paper.

8. A cured composition resulting from the cure of the curable composition according to claim 1.

9. A method of making a sound barrier film comprising the step of curing the lined film according to claim 7 while the film is borne on said liner.

10. A cured composition comprising a rubber comprising a crosslinked chloroprene resin and a fire retardant particle system comprising:
    d) 5-95 wt % particulate magnesium hydroxide $(Mg(OH)_2)$; and
    e) 5-95 wt % particulate aluminum trihydrate $(Al(OH)_3)$, wherein the particulate aluminum trihydrate (Al(OH)) has a mean particle size of greater than 30 microns.

11. The cured composition according to claim 10 wherein the particulate aluminum trihydrate $(Al(OH)_3)$ has a mean particle size of less than 400 microns.

12. The cured composition according to claim 10 wherein the particulate aluminum trihydrate $(Al(OH)_3)$ has a mean particle size of greater than 82 microns.

13. A sound barrier film comprising the cured composition according to claim 9 having a thickness of less than 1300 microns and greater than 135 microns.

14. The sound barrier film according to claim 13 which is fire resistant to the extent that it passes the test specified on the filing date of this application in Appendix F, part VI, of US Federal Aviation Regulations § 25.856(a).

* * * * *

UNITED STATES PATENT AND TRADEMARK OFFICE
CERTIFICATE OF CORRECTION

PATENT NO. : 10,501,612 B2
APPLICATION NO. : 15/571086
DATED : December 10, 2019
INVENTOR(S) : Pingfan Wu et al.

Page 1 of 1

It is certified that error appears in the above-identified patent and that said Letters Patent is hereby corrected as shown below:

On the Title Page

Item (57), under the (Abstract)
Line 5, delete "benzothiazoles-ulfenamide." and insert -- benzothiazolesulfenamide. --, therefor.

In the Specification

Column 11
Line 51, delete "(35.562 Kg)" and insert -- (35,562 Kg) --, therefor.

Signed and Sealed this
Eleventh Day of February, 2020

Andrei Iancu
*Director of the United States Patent and Trademark Office*